United States Patent [19]

Homann et al.

[11] Patent Number: 5,468,441
[45] Date of Patent: Nov. 21, 1995

[54] PROCESS FOR PREPARING HIGH-MOLECULAR WEIGHT POLYESTERS

[75] Inventors: Walter K. Homann, Dülmen; Thomas Große-Puppendahl, Haltern; Wilhelm Brügging, Recklinghausen, all of Germany

[73] Assignee: Huels Aktiengesellschaft, Marl, Germany

[21] Appl. No.: 293,557

[22] Filed: Aug. 22, 1994

[30] Foreign Application Priority Data

Sep. 6, 1993 [DE] Germany ............ 43 30 062.6

[51] Int. Cl.⁶ .................................................. C08G 63/80
[52] U.S. Cl. .................. 264/331.21; 528/274; 528/308; 528/308.7; 528/308.8; 528/491; 528/503
[58] Field of Search ................... 528/308, 308.7, 528/308.8, 491, 503, 274; 264/331.21

[56] References Cited

U.S. PATENT DOCUMENTS 4,973,655  11/1990  Pipper ........................... 528/308

FOREIGN PATENT DOCUMENTS

| 0049823 | 4/1982  | European Pat. Off. . |
| 0344733 | 12/1989 | European Pat. Off. . |
| 0346735 | 12/1989 | European Pat. Off. . |
| 0615995 | 9/1994  | European Pat. Off. . |
| 2509790 | 9/1976  | Germany . |

*Primary Examiner*—Patricia A. Short
*Attorney, Agent, or Firm*—Oblon, Spivak, McClelland, Maier & Neustadt

[57] ABSTRACT

A high-molecular-weight polyester is prepared by polycondensing an aromatic dicarboxylic acid with a mixture of alkanediols and alkenediols with substantial exclusion of oxygen and in the presence of a catalyst, until a viscosity number in the range from 50 to 140 cm³/g is reached and then postcondensing the polycondensed material in the solid-phase until the required viscosity number is reached.

14 Claims, No Drawings

PROCESS FOR PREPARING HIGH-MOLECULAR WEIGHT POLYESTERS

BACKGROUND OF THE INVENTION

1. Field of the Invention

The invention relates to a process for preparing high-molecular-weight polyesters by reacting an aromatic dicarboxylic acid with a mixture of alkanediols and alkenediols with substantial exclusion of oxygen in the presence of a catalyst.

2. Description of the Background

High-molecular-weight polyesters are excellent materials having specific properties which enable them to be used as raw materials for strong high-tech products. It is typical of this application area that frequently, judged according to industrial criteria, relatively small amounts of polyester having an exactly prescribed high molecular weight are required.

Since, in large-scale production, polyesters are obtained continuously or batchwise in large amounts having a uniform molecular weight, it is usually uneconomical and also technically difficult to make available smaller fractional amounts having a defined high molecular weight.

Polyesters having a high molecular weight are known in the prior art. They contain, inter alia, residual amounts of unsaturated monomer components which may, if desired, be crosslinked with thermolabile compounds (DE-A 25 09 726; DE-A 25 09 790; DE-A 25 52 424). It is characteristic of these disclosures that the final molecular weight has to be set as the polyester is being synthesized. A subsequent manipulation of the molecular weight is impossible or leads to a deterioration in product properties.

In principle, it is also known in the prior art that polyesters can be subjected to a solid-phase postcondensation. However, this usually requires relatively long times. Furthermore, only a small increase in the viscosity of the polyester is achieved. A need therefore continues to exist for an effective way of preparing small amounts of polyester of high molecular weight.

SUMMARY OF THE INVENTION

Accordingly, one object of the present invention is to find a way of quickly and advantageously preparing relatively small amounts of polyester of high molecular weight.

Briefly, this object and other objects of the invention as hereinafter will become more readily apparent can be attained by a method of preparing a high molecular weight polyester by polycondensing an aromatic dicarboxylic acid with a mixture of alkanediols and alkenediols with substantial exclusion of oxygen in the presence of a catalyst until a viscosity number in the range 50–140 cm$^3$/g is reached and then postcondensing the polyester thus obtained in the solid-phase until the required viscosity number is reached.

DETAILED DESCRIPTION OF THE PREFERRED EMBODIMENTS

The polyesters of the invention are prepared by esterification or transesterification and subsequent polycondensation of aromatic dicarboxylic acids or polyester-forming derivatives thereof with a diol mixture in the presence of a catalyst (Sorenson and Campbell, Preparative Methods of Polymer Chemistry, Interscience Publishers Inc., (N.Y.), 1961, pages 111 to 127; Kunststoff-Handbuch, Volume VIII, C. Hanser Verlag Munich, 1973; J. Polym. Sci., Part A 1, 4, pages 1851 to 1859, 1966). The temperatures of the reaction lie in the range from 160° to 350° C., preferably in the range from 170° to 280° C. Any given reaction occurs with the substantial exclusion of oxygen. For this reason, the reaction is carried out in an inert gas atmosphere. Suitable inert gases include, for example, noble gases, nitrogen, carbon dioxide, and the like. The reaction is carried out at atmospheric pressure or in vacuo. Preferably, the polycondensation step is carried out in vacuo.

The preparation of poly(ethylene terephthalate) and poly(butylene terephthalate) by the process of the invention is preferred.

The aromatic dicarboxylic acid used is usually terephthalic acid. However, other aromatic dicarboxylic acids such as, for example, phthalic acid, isophthalic acid, naphthalene dicarboxylic acid and the like, and mixtures thereof, can also be used.

Up to 30 mol % of the aromatic dicarboxylic acid in the polyesters can be replaced by other, optionally aliphatic, dicarboxylic acids which are known per se and have from 2 to 36 carbon atoms in the carbon skeleton. Examples of suitable dicarboxylic acids include isophthalic acid, phthalic acid, 1,4-cyclohexanedicarboxylic acid, adipic acid, sebacic acid, azelaic acid, decanedicarboxylic acid and dimeric fatty acid.

The diol component comprises, on the one hand, alkanediols having from 2 to 12 carbon atoms in the carbon chain. Preference is here given to ethylene glycol and butane-1,4-diol. On the other hand, alkenediols having from 4 to 12 carbon atoms in the carbon chain are used. The preferred diols include butene-1,4-diol, 2-pentene-1,5-diol and 3-methyl-2-pentene-1,5-diol. Up to 30 mol % of the alkanediol component of the polyester can be replaced by another diol, such as, for example, neopentyl glycol, 1,4- or 1,3-dimethylolcyclohexane or mixtures thereof.

The ratio of alkanediol to alkenediol ranges from 0.1–99.9 mol % to 99.9–0.1 mol %, preferably 80–99.5 mol % to 20–0.5 mol %.

For the purposes of the present invention, polyesters also include block copolyesters. Such products are described, for example, in Chimia 28 (9), pages 544 to 552 (1974) and in Rubber Chemistry and Technology 50, pages 688 to 703 (1977). These block copolyesters contain, in addition to the abovementioned aromatic dicarboxylic acids and diols, a poly(oxyalkylene)diol having a molecular weight in the range from about 600 to 2500. Preferred poly(oxyalkylene) diols are poly(oxyethylene)diol, poly(oxypropylene)diol and poly(oxytetramethylene)diol. The amount of the poly(oxyalkylene)diols is in the range from 4 to 40% by weight, preferably from 10 to 35% by weight (based on the total block copolyester).

The polycondensation of the reacting dicarboxylic acid and diol materials is initially continued until a viscosity number J=50–140 cm$^3$/g, preferably J=60–120 cm$^3$/g, is reached.

Subsequent to the polycondensation step, the low-molecular-weight polyester is thermally treated in the solid phase in the form of granules, chips or powder. The treatment can be carried out, for example, in a tumble drier, a rotary evaporator, a column reactor or the .like. It is carried out under an inert gas atmosphere at a temperature within the range of 5° to 60° C., preferably from 5° to 30° C., below the melting point of the polyester. Suitable inert gases include, for example, noble gases, nitrogen, carbon dioxide and the like.

The postcondensation reaction of the ingredients can be considerably shortened further by carrying out the postcondensation in the presence of a free-radical former. For this preferred procedure, the free-radical formers selected are those whose decomposition at the abovementioned temperatures for the postcondensation reaction have a half-life in the range 5 s-18 h, preferably 10 min-12 h.

The free-radical formers are used in an amount in the range 0.001–8% by weight, preferably 0.01–5% by weight, based on the polyester used and usually decompose at a temperature ranging from 180° to 250° C.

Suitable free-radical formers include organic peroxides such as (cyclo)aliphatic or aromatic peroxides, hydroperoxides or perketals, such as, for example, 2,5-bis(tert.-butyl-peroxy) -2,5-dimethylhexane, diisopropylbenzene monohydroperoxide, dicumyl peroxide and 3,3,6,6,9,9-hexamethyl -1,2,4,5-tetraoxacyclononane,, organic compounds having a labile C—C bond such as, for example, 2,3-dimethyl-2,3-diphenylbutane, 3,4-dimethyl-3,4-diphenylhexane and poly-1,4-diisopropylbenzene, or organic compounds having a labile N—N bond such as, for example, 2,2'-azobis(2-acetoxypropane).

Additional details of the free-radical formers with respect to decomposition temperatures, half-lives etc. can be obtained from company publications of the manufacturers. Examples of such publications are Organic Peroxides for Crosslinking Polyolefins and Elastomers from Elf Atochem, Germany, (10/92) and Initiators for Polymer Production from Akzo, The Netherlands, (4/89).

The addition of the free-radical formers is appropriately carried out, for example, together with other additives, for example during discharge from the polycondensation step via an extruder or during compounding in a mixing extruder. Single- or twin-screw kneaders or co-kneaders can also be used. The mixing temperature lies between 160° and 320° C., preferably between 220° and 280° C., with the residence time lying between a few seconds and several minutes. To simplify the metered addition of the free-radical former into the extruder, it can in some cases be appropriate to use a carrier material obtained, for example, by incorporating the free-radical former into a suitable polymer. This has the advantage that in this way even very small amounts of free-radical formers can be metered in with certainty.

The polyesters which have been prepared by the process of the invention have a viscosity number of up to 500 cm$^3$/g, preferably from 100 to 450 cm$^3$/g.

The polyesters obtained according to the invention can be processed in conventional machines by injection molding or extrusion to give molding compounds.

The polyesters can additionally contain auxiliaries and additives. These can be, for example, nucleating agents, matt finishing agents, flow control agents or other processing aids and also pigments, fillers and reinforcing materials.

Nucleating agents, matt finishing agents, flow control agents and other processing aids can be present in the polyester in amounts of up to 6% by weight, preferably from 0.2 to 3.5% by weight, based on the total mixture.

Pigments, fillers and reinforcing materials are present in the polyester in amounts of up to 60% by weight, preferably from 1 to 50% by weight, based on the total mixture.

The process of the invention has several advantages:

Large amounts of base polycondensate can be prepared quickly and economically, continuously or batchwise.

In comparison to art known procedures, the desired high final viscosity number can be achieved very quickly.

Relatively small amounts of polyester can be economically tailored to a required high viscosity number.

The good general properties such as thermal and mechanical stability, processing stability, inherent color and the like are not adversely affected.

The polyesters of the invention can be used to prepare molding compounds from which films, sheathing, profiles, pipes, hollow articles and also shaped parts by injection molding can be produced.

Having now generally described this invention, a further understanding can be obtained by reference to certain specific examples which are provided herein for purposes of illustration only and are not intended to be limiting unless otherwise specified. Parameter J was determined by means of the method given below:

The viscosity number (J value) was measured on solutions of 0.5 g of polyester in 100 ml of phenol/o-dichlorobenzene (in a molar ratio of 1:1) at 25° C. (DIN 16 779).

The experiments denoted by letters are not within the scope of the invention.

EXAMPLE A

A 100 parts by weight amount of a thermoplastic polyester having a J value of 106 cm$^3$/g, which has been prepared by a known process of transesterification of dimethyl terephthalate with butane-1,4-diol using isopropyl titanate as catalyst and subsequent polycondensation under reduced pressure, is postcondensed for 24 hours as shown in Table 1 without a free-radical former in a rotary evaporator at 215° C. and under nitrogen flow, and subsequently discharged. The polyester then has a J value of 199 cm$^3$/g.

Example 1

A 100 parts by weight amount of a thermoplastic polyester having a J value of 112 cm$^3$/g, which has been prepared by a known process of transesterification of dimethyl terephthalate with a diol component comprising 99 mol % of butane-1,4-diol and 1 mol % of 2-butene-1,4-diol using isopropyl titanate as catalyst and subsequent polycondensation under reduced pressure, is postcondensed for 24 hours as shown in Table 1 without a free-radical former in a rotary evaporator at 215° C. and under nitrogen flow. The polyester then has a J value of 225 cm$^3$/g.

Example 2

The experiment described in Example 1 is repeated, the diol component used comprising 97 mol % of butane-1,4-diol and 3 mol % of 2-butene-1,4-diol. The initial J value is 112 cm$^3$/g. After the solid-phase postcondensation at 215° C./24 hours under nitrogen flow, the polyester has a J value of 228 cm$^3$/g.

Example 3

The experiment described in Example 1 is repeated, the diol component used comprising 95 mol % of butane-1,4-diol and 5 mol % of 2-butene-1,4-diol. The initial J value is 109 cm$^3$/g. After the solid-phase postcondensation at 215° C. for 24 hours under nitrogen flow, the polyester has a J value of 232 cm$^3$/g.

EXAMPLE B

The experiment described in Example A is repeated, except that 1% by weight of the free-radical former is added to the polyester in the solid-phase postcondensation. The polyester then has a J value of 198 cm$^3$/g.

Example 4

The experiment described in Example 1 is repeated, except that 1% by weight of the free-radical former is added to the polyester in the solid-phase postcondensation. The polyester then has a J value of 241 cm$^3$/g.

Example 5

The experiment described in Example 1 is repeated, except that 2% by weight of a free-radical former is added to the polyester in the solid-phase postcondensation. The polyester then has a J value of 267 cm$^3$/g.

Example 6

The experiment described in Example 2 is repeated, except that 1% by weight of a free-radical former is added to the polyester in the solid-phase postcondensation. The polyester then has a J value of 371 cm$^3$/g.

Example 7

The experiment described in Example 3 is repeated, except that 1% by weight of a free-radical former is added to the polyester in the solid-phase postcondensation. The polyester then has a J value of 383 cm$^3$/g.

EXAMPLE C

The experiment described in Example A is repeated, except that 1.5% by weight of a free-radical former is added to the polyester in the solid-phase postcondensation. The polyester then has a J value of 200 cm$^3$/g.

Example 8

The experiment described in Example 1 is repeated, except that 0.5% by weight of a free-radical former is added to the polyester in the solid-phase postcondensation. The initial J value is 104 cm$^3$/g. After the solid-phase postcondensation at 215° C./24 hours under nitrogen flow, the polyester has a J value of 245 cm$^3$/g.

Example 9

The experiment described in Example 8 is repeated, except that 1.5% by weight of a free-radical former is added to the polyester in the solid-phase postcondensation. The polyester then has a J value of 291 cm$^3$/g.

EXAMPLE D

The experiment described in Example A is repeated, except that 1% by weight of a free-radical former is added to the polyester in the solid-phase postcondensation. The polyester then has a J value of 198 cm$^3$/g.

Example 10

The experiment described in Example 9 is repeated, except that 1% by weight of a free-radical former is added to the polyester in the solid-phase postcondensation. The polyester then has a J value of 248 cm$^3$/g.

EXAMPLE E 100 parts by weight of a thermoplastic polyester having a J value of 106 cm$^3$/g, which has been prepared by a known process of transesterification of dimethyl terephthalate with butane-1,4-diol using isopropyl titanate as catalyst and subsequent polycondensation under reduced pressure, are postcondensed for 9 hours as shown in Table 2 without a free-radical former in a rotary evaporator at 200° C. and under nitrogen flow, and subsequently discharged. The polyester then has a J value of 159 cm$^3$/g.

Example 11

100 parts by weight of a thermoplastic polyester having a J value of 105 cm$^3$/g, which has been prepared by a known process of transesterification of dimethyl terephthalate with a diol comprising 80 mol % of butane-1,4-diol and 20 mol % of 2-butene-1,4-diol using isopropyl titanate as catalyst and subsequent polycondensation under reduced pressure, are postcondensed for 9 hours as shown in Table 2 without a free-radical former in a rotary evaporator at 200° C. and under nitrogen flow, and subsequently discharged. The polyester then has a J value of 179 cm$^3$/g.

EXAMPLE F

The experiment described in Example E is repeated, except that 0.5% by weight of a free-radical former is added to the polyester in the solid-phase postcondensation. The polyester then has a J value of 158 cm$^3$/g.

Example 12

The experiment described in Example 11 is repeated, except that 0.5% by weight of a free-radical former is added to the polyester in the solid-phase postcondensation. The polyester then has a J value of 188 cm$^3$/g.

EXAMPLE G 100 parts by weight of a thermoplastic polyester having a J value of 106 cm$^3$/g, which has been prepared by a known process of transesterification of dimethyl terephthalate with butane-1,4-diol using isopropyl titanate as catalyst and subsequent polycondensation under reduced pressure, are postcondensed for 12 hours without a free-radical former in a rotary evaporator at 200° C. and under nitrogen flow, and subsequently discharged. The polyester has a J value of 163 cm$^3$/g.

Example 13

100 parts by weight of a thermoplastic polyester having a J value of 110 cm$^3$/g, which has been prepared by a known process of transesterification of dimethyl terephthalate with a diol component comprising 95 mol % of butane-1,4-diol and 5 mol % of 2-butene-1,4-diol using isopropyl titanate as catalyst and subsequent polycondensation under reduced pressure, are postcondensed for 8 hours without a free-radical former in a rotary evaporator at 200° C. and under nitrogen flow, and subsequently discharged. The polyester has a J value of 173 cm$^3$/g.

EXAMPLE H 100 parts by weight of a thermoplastic polyester having a J value of 106 cm$^3$/g, which has been prepared by a known process of transesterification of dimethyl terephthalate with butane-1,4-diol using isopropyl titanate as catalyst and subsequent polycondensation under reduced pressure, are postcondensed for 12 hours with 1.0% by weight of a free-radical former in a rotary evaporator at 200° C. and under nitrogen flow, and subsequently discharged. The polyester has a J value of 162 cm$^3$/g.

Example 14

100 parts by weight of a thermoplastic polyester having a J value of 110 cm$^2$/g, which has been prepared by a known process of transesterification of dimethyl terephthalate with a diol comprising 95 mol % of butane-1,4-diol and 5 mol % of 2-butene-1,4-diol using isopropyl titanate as catalyst and subsequent polycondensation under reduced pressure, are postcondensed for 8 hours with 1.0% by weight of a free-radical former in a rotary evaporator at 200° C. and under nitrogen flow, and subsequently discharged. The polyester has a J value of 352 cm$^3$/g.

Example 15

The experiment described in Example 2 is repeated, except that the postcondensation time is reduced to 3 hours.

The polyester has a J value of 177 cm$^3$/g.

Free-radical formers used were:

I. 2,3-dimethyl-2,3-diphenylbutane, e.g. INTEROX® CCDFB from Peroxid Chemie, Höllriegelskreuth.

II. Poly-1,4-diisopropylbenzene, e.g. INTEROX VP® 156 from Peroxid Chemie, Höllriegelskreuth.

III. 2, 2'-azodi(2-acetoxypropane), e.g. LUAZ® AP from Elf Atochem, France.

TABLE 1

Solid-phase postcondensation 215° C./24 h, N$_2$ flow

| Example | Diol component [mol %] BID*) | B2D*) | Initiator type | Initiator concentration [% by weight] | Initial J Value [cm³/g] | Final J Value [cm³/g] | Δ J Value [%] |
|---|---|---|---|---|---|---|---|
| A | 100 | — | — | — | 106 | 199 | 88 |
| 1 | 99 | 1 | — | — | 112 | 225 | 101 |
| 2 | 97 | 3 | — | — | 112 | 228 | 103 |
| 3 | 95 | 5 | — | — | 109 | 232 | 113 |
| B | 100 | — | Interox CCDFB | 1 | 106 | 198 | 87 |
| 4 | 99 | 1 | Interox CCDFB | 1 | 112 | 241 | 115 |
| 5 | 99 | 1 | Interox CCDFB | 1 | 112 | 267 | 138 |
| 6 | 97 | 3 | Interox CCDFB | 2 | 112 | 371 | 231 |
| 7 | 95 | 5 | Interox CCDFB | 1 | 109 | 383 | 251 |
| C | 100 | — | Luazo AP | 1.5 | 106 | 200 | 89 |
| 8 | 99 | 1 | Luazo AP | 0.5 | 104 | 245 | 136 |
| 9 | 99 | 1 | Luazo AP | 1.5 | 104 | 291 | 180 |
| D | 100 | — | Interox VP 156 | 1.0 | 106 | 198 | 87 |
| 10 | 99 | 1 | Interox VP 156 | 1.0 | 104 | 248 | 138 |

*)BID: butane-1,4-diol
B2D: 2-butene-1,4-diol

TABLE 2

Solid-phase postcondensation 200° C./9 h, N$_2$ flow

| Example | Diol component [mol %] B1D*) | B2D*) | Initiator type | Initiator concentration [% by weight] | Initial J Value [cm³/g] | Final J Value [cm³/g] | Δ J Value [%] |
|---|---|---|---|---|---|---|---|
| E | 100 | — | — | — | 106 | 159 | 50 |
| 11 | 80 | 20 | Interox CCDFB | 0.5 | 105 | 179 | 71 |
| F | 100 | — | Interox CCDFB | — | 106 | 158 | 49 |
| 12 | 80 | 20 | Interox CCDFB | 0.5 | 105 | 188 | 79 |

*) B1D: butane-1,4-diol
B2D: 2-butene-1,4-diol

TABLE 3

| | Diol component [mol %] | | Initiator | Initiator concentration | Postcondensation time | Initial J Value | Final J Value | Δ J Value |
|---|---|---|---|---|---|---|---|---|
| Example | B1D*) | B2D*) | type | [% by weight] | [h] | [cm³/g] | [cm³/g] | [%] |
| G | 100 | — | — | — | 12 | 106 | 163 | 54 |
| 13 | 95 | 5 | — | — | 8 | 110 | 173 | 57 |
| H | 100 | — | Interox CCDFB | 1 | 12 | 106 | 162 | 53 |
| 14 | 95 | 5 | Interox CCDFB | 1 | 8 | 110 | 352 | 220 |
| 15 | 95 | 5 | Interox CCDFB | 1 | 3 | 110 | 177 | 61 |

Solid-phase postcondensation 200° C., N₂ flow

*) B1D: butane-1,4-diol
B2D: 2-butene-1,4-diol

What is claimed as new and desired to be secured by letters patent of the United States is:

1. A process for preparing a high-molecular weight polyester comprising:

polycondensing an aromatic dicarboxylic acid with a mixture of alkanediols and alkenediols with substantial exclusion of oxygen and in the presence of a catalyst until a viscosity number in the range from 50 to 140 cm³/g is reached; and then postcondensing the polycondensed material in the solid-phase in the presence of a free-radical former added to the postcondensed material in an amount within the range from 0.001 to 8% by weight until the required viscosity number is reached.

2. The process according to claim 1, wherein the polycondensation is continued until a viscosity number in the range from 60 to 120 cm³/g is reached.

3. The process according to claim 1 or 2, wherein the solid-phase postcondensation is carried out at a temperature which is from 5° to 60° C. below the melting point of the polyester.

4. The process according to claim 1, wherein the amount of free-radical former is in the range from 0.01 to 5% by weight.

5. The process according to claim 1, wherein the free-radical former decomposes at a temperature in the range from 180° to 280° C.

6. The process according to claim 1, wherein the free-radical former decomposes with a half-life in the range from 5 s to 18 h.

7. The process according to claim 1, wherein the free-radical former is an organic peroxide.

8. The process according to claim 1, wherein the free-radical former has a labile C—C bond.

9. The process according to claim 1, wherein the free-radical former has a labile organic N—N bond.

10. The process according to claim 1, wherein the polyester has a final viscosity number of ≦500 cm³/g.

11. The process according to claim 1, wherein the polyester has a final viscosity number in the range from 100 to 450 cm³/g.

12. The process according to claim 1, wherein the free-radical former is mixed in the polyester at a temperature of about 160°–320° C.

13. A method of injection molding, comprising: forming an object of a particulars shape by the injection molding of the high molecular weight polyester formed by the process of claim 1 into an object of a particular shape.

14. The method of claim 13, wherein the injection molding process forms films, sheathing, profiles, pipes, hollow articles and shaped parts.

* * * * *